US009584568B2

(12) United States Patent
Tanabe

(10) Patent No.: US 9,584,568 B2
(45) Date of Patent: Feb. 28, 2017

(54) SIGNAL PROCESSING APPARATUS AND SIGNAL PROCESSING METHOD THEREOF FOR IMPLEMENTING A BROADCAST OR A MULTICAST COMMUNICATION

(71) Applicant: Yosuke Tanabe, Tokyo (JP)

(72) Inventor: Yosuke Tanabe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/398,950

(22) PCT Filed: May 8, 2013

(86) PCT No.: PCT/JP2013/062929
§ 371 (c)(1),
(2) Date: Nov. 4, 2014

(87) PCT Pub. No.: WO2013/168737
PCT Pub. Date: Nov. 14, 2013

(65) Prior Publication Data
US 2015/0103824 A1  Apr. 16, 2015

(30) Foreign Application Priority Data

May 9, 2012  (JP) .................... 2012-107595

(51) Int. Cl.
*H04L 29/06* (2006.01)
*H04L 12/46* (2006.01)
*H04L 12/931* (2013.01)

(52) U.S. Cl.
CPC ...... *H04L 65/4076* (2013.01); *H04L 12/4641* (2013.01); *H04L 69/22* (2013.01); *H04L 49/201* (2013.01)

(58) Field of Classification Search
None
See application file for complete search history.

(56) References Cited

U.S. PATENT DOCUMENTS 6,937,574 B1   8/2005  Delaney et al.
2006/0209871 A1  9/2006  Blasco Claret et al.
(Continued)

FOREIGN PATENT DOCUMENTS

CN   101060449 A   10/2007
CN   101079775 A   11/2007
(Continued)

OTHER PUBLICATIONS

European Search Report dated Nov. 24, 2015.
(Continued)

*Primary Examiner* — Gary Mui
(74) *Attorney, Agent, or Firm* — Sughrue Mion, PLLC

(57) ABSTRACT

A communication system includes: a control apparatus that sets broadcast domains or multicast domains respectively for virtual networks configured in a physical network including a forwarding node(s), and sets, in the forwarding node(s), broadcast or multicast control information, associating a packet forwarding destination and a match condition including an identifier for identifying one of the broadcast domains or multicast domains; and the forwarding node(s) that performs a broadcast or multicast using the broadcast or multicast control information.

21 Claims, 21 Drawing Sheets

(56) References Cited

U.S. PATENT DOCUMENTS

| | | | |
|---|---|---|---|
| 2008/0298365 A1* | 12/2008 | Mitumori | H04L 12/66 370/390 |
| 2009/0049175 A1 | 2/2009 | Finn | |
| 2009/0122801 A1 | 5/2009 | Chang | |
| 2011/0019678 A1 | 1/2011 | Mehta et al. | |
| 2013/0010600 A1* | 1/2013 | Jocha | H04L 43/026 370/236.2 |
| 2013/0034104 A1* | 2/2013 | Yedavalli | H04L 41/12 370/400 |
| 2013/0054761 A1* | 2/2013 | Kempf | H04L 47/781 709/220 |
| 2013/0058229 A1* | 3/2013 | Casado | H04L 45/745 370/252 |
| 2013/0058351 A1* | 3/2013 | Casado | H04L 49/25 370/400 |
| 2013/0275592 A1* | 10/2013 | Xu | H04L 45/14 709/225 |
| 2013/0291088 A1* | 10/2013 | Shieh | H04L 63/0218 726/11 |

FOREIGN PATENT DOCUMENTS

| | | |
|---|---|---|
| CN | 101217463 A | 7/2008 |
| CN | 101778035 A | 7/2010 |
| CN | 101779198 A | 7/2010 |
| CN | 101964746 A | 2/2011 |
| CN | 102136981 A | 7/2011 |
| JP | 2000-286853 A | 10/2000 |
| JP | 2002-247089 A | 8/2002 |
| JP | 2004-266874 A | 9/2004 |
| JP | 2007-534191 A | 11/2007 |
| WO | 2009/086757 A1 | 7/2009 |
| WO | WO 2012/090993 A1 | 7/2012 |

OTHER PUBLICATIONS

"IEEE Standard for Local and metropolitan area networks—Media Access Control (MAC) Bridges and Virtual Bridged Local Area Networks: IEEE Std 802.1Q-2011 (Revision of IEEE Std 802.1Q-2005)", IEEE Standard, IEEE, Piscataway, NJ, USA, Aug. 31, 2011 (Aug. 31, 2011), pp. 1-1365, XP017694667, ISBN: 978-0-7381-6708-4, Section 5.4. Section 8.

Japanese Office Action dated Sep. 8, 2015 with an English translation thereof.

Martin Casado, et al., "Ethane: Taking Control of the Enterprise", Proceedings of the 2007 conference on Applications, Technologies, Architectures, and Protocols for Computer Communications, Oct. 2007, pp. 1-12.

International Search Report in [PCT/JP2011/080178] dated [Jan. 18, 2012] (English Translation Thereof).

Nick McKeown et al., "OpenFlow: Enabling Innovation in Campus Networks," [online], [search carried out on Mar. 14, 2012], Internet <URL: http://www.openflow.org/documents/openflow-wp-latest.pdf>.

"OpenFlow Switch Specification, Version 1.0.0. Implemented (Wire Protocol 0x02)," [online], [search carried out on Mar. 14, 2012], Internet Feburary 28, 2011. <URL:http://www.openflow.org/documents/openflow-spec-v1.1.0.pdf>.

Kok-Kiong Yap, "Towards Software-Friendly Networks," APSys '10 Proceedings of the first ACM asia-pacific workshop on Workshop on systems, 2010, pp. 49 to 53.

Communication dated Aug. 29, 2016, from the State Intellectual Property Office of the P.R.C., in counterpart Chinese application No. 201380023703.X.

\* cited by examiner

FIG. 6

Table#1

| FLOW ENTRY NO. | In Port | L2 SOURCE ADDRESS | L2 DESTINATION ADDRESS | L2 VLAN ID | MPLS LABEL | INSTRUCTION |
|---|---|---|---|---|---|---|
| 1 | EXTERNAL NODE 300A CONNECTION PORT | any | BCMC ADDRESS | any | NONE | TO TABLE #2 |
| 2 | FORWARDING NODE 200B CONNECTION PORT | any | BCMC ADDRESS | any | 1 (BC DOMAIN ID) | DELETE MPLS Shim HEADER, CHANGE TO VLAN ID 10, OUTPUT FROM EXTERNAL NODE 300A CONNECTION PORT |
| 3 | FORWARDING NODE 200B CONNECTION PORT | any | BCMC ADDRESS | any | any | OUTPUT FROM FORWARDING NODE 200C CONNECTION PORT |
| 4 | FORWARDING NODE 200C CONNECTION PORT | any | BCMC ADDRESS | any | any | OUTPUT FROM FORWARDING NODE 200B CONNECTION PORT |
| 5 | any | any | BCMC ADDRESS | any | any | Drop |

Table#2

| FLOW ENTRY NO. | In Port | L2 SOURCE ADDRESS | L2 DESTINATION ADDRESS | L2 VLAN ID | MPLS LABEL | INSTRUCTION |
|---|---|---|---|---|---|---|
| 1 | any | any | BCMC ADDRESS | 10 | NONE | INSERT MPLS Shim HEADER (LABEL IS BC DOMAIN ID =1), OUTPUT FROM FORWARDING NODE 200B CONNECTION PORT |
| 2 | any | any | BCMC ADDRESS | any | any | Drop |

FIG. 7

Table#1

| FLOW ENTRY NO. | In Port | L2 SOURCE ADDRESS | L2 DESTINATION ADDRESS | L2 VLAN ID | MPLS LABEL | INSTRUCTION |
|---|---|---|---|---|---|---|
| 1 | EXTERNAL NODE 300B CONNECTION PORT | any | BCMC ADDRESS | any | NONE | OUTPUT FROM EXTERNAL NODE 300C CONNECTION PORT, TO TABLE #2 |
| 2 | EXTERNAL NODE 300C CONNECTION PORT | any | BCMC ADDRESS | any | NONE | OUTPUT FROM EXTERNAL NODE 300B CONNECTION PORT, TO TABLE #2 |
| 3 | FORWARDING NODE 200A CONNECTION PORT | any | BCMC ADDRESS | any | 1 (BC DOMAIN ID) | DELETE MPLS Shim HEADER, CHANGE TO VLAN ID 20, OUTPUT FROM EXTERNAL NODE 300B CONNECTION PORT |
| 4 | FORWARDING NODE 200A CONNECTION PORT | any | BCMC ADDRESS | any | 2 (BC DOMAIN ID) | DELETE MPLS Shim HEADER, CHANGE TO VLAN ID 30, OUTPUT FROM EXTERNAL NODE 300C CONNECTION PORT |
| 5 | any | any | BCMC ADDRESS | any | any | Drop |

Table#2

| FLOW ENTRY NO | In Port | L2 SOURCE ADDRESS | L2 DESTINATION ADDRESS | L2 VLAN ID | MPLS LABEL | INSTRUCTION |
|---|---|---|---|---|---|---|
| 1 | any | any | BCMC ADDRESS | 20 | NONE | INSERT MPLS Shim HEADER (LABEL IS BC DOMAIN ID = 1), OUTPUT FROM FORWARDING NODE 200A CONNECTION PORT |
| 2 | any | any | BCMC ADDRESS | 30 | NONE | INSERT MPLS Shim HEADER (LABEL IS BC DOMAIN ID = 2), OUTPUT FROM FORWARDING NODE 200A CONNECTION PORT |
| 3 | any | any | BCMC ADDRESS | any | any | Drop |

FIG. 8

Table#1

| FLOW ENTRY NO. | In Port | L2 SOURCE ADDRESS | L2 DESTINATION ADDRESS | L2 VLAN ID | MPLS LABEL | INSTRUCTION |
|---|---|---|---|---|---|---|
| 1 | EXTERNAL NODE 300D CONNECTION PORT | any | BCMC ADDRESS | any | NONE | OUTPUT FROM EXTERNAL NODE 300E CONNECTION PORT, TO TABLE #2 |
| 2 | EXTERNAL NODE 300E CONNECTION PORT | any | BCMC ADDRESS | any | NONE | OUTPUT FROM EXTERNAL NODE 300D CONNECTION PORT, TO TABLE #2 |
| 3 | FORWARDING NODE 200A CONNECTION PORT | any | BCMC ADDRESS | any | 2 (BC DOMAIN ID) | DELETE MPLS Shim HEADER, CHANGE TO VLAN ID 20, OUTPUT FROM EXTERNAL NODE 300D CONNECTION PORT OUTPUT FROM EXTERNAL NODE 300E CONNECTION PORT |
| 4 | any | any | BCMC ADDRESS | any | any | Drop |

Table#2

| FLOW ENTRY NO. | In Port | L2 SOURCE ADDRESS | L2 DESTINATION ADDRESS | L2 VLAN ID | MPLS LABEL | INSTRUCTION |
|---|---|---|---|---|---|---|
| 1 | any | any | BCMC ADDRESS | 20 | NONE | INSERT MPLS Shim HEADER (LABEL IS BC DOMAIN ID = 2), OUTPUT FROM FORWARDING NODE 200A CONNECTION PORT |
| 2 | any | any | BCMC ADDRESS | any | any | Drop |

FIG. 13

Table#1

| FLOW ENTRY NO. | In Port | L2 SOURCE ADDRESS | L2 DESTINATION ADDRESS | L2 VLAN ID | MPLS LABEL | INSTRUCTION |
|---|---|---|---|---|---|---|
| 1 | EXTERNAL NODE 300A CONNECTION PORT | any | BCMC ADDRESS | 10 | NONE | INSERT MPLS Shim HEADER (LABEL IS BC DOMAIN ID =1), OUTPUT FROM FORWARDING NODE 200B CONNECTION PORT, TO TABLE #2 |
| 2 | FORWARDING NODE 200B CONNECTION PORT | any | BCMC ADDRESS | any | 1 (BC DOMAIN ID) | DELETE MPLS Shim HEADER, CHANGE TO VLAN ID 10, OUTPUT FROM EXTERNAL NODE 300A CONNECTION PORT |
| 3 | FORWARDING NODE 200B CONNECTION PORT | any | BCMC ADDRESS | any | any | OUTPUT FROM FORWARDING NODE 200C CONNECTION PORT |
| 4 | FORWARDING NODE 200C CONNECTION PORT | any | BCMC ADDRESS | any | any | OUTPUT FROM FORWARDING NODE 200B CONNECTION PORT |
| 5 | any | any | BCMC ADDRESS | any | any | Drop |

Table#2

| FLOW ENTRY NO. | In Port | L2 SOURCE ADDRESS | L2 DESTINATION ADDRESS | L2 VLAN ID | MPLS LABEL | INSTRUCTION |
|---|---|---|---|---|---|---|
| 1 | any | any | BCMC ADDRESS | any | any | Drop |

FIG. 14

Table#1

| FLOW ENTRY NO. | In Port | L2 SOURCE ADDRESS | L2 DESTINATION ADDRESS | L2 VLAN ID | MPLS LABEL | INSTRUCTION |
|---|---|---|---|---|---|---|
| 1 | EXTERNAL NODE 300B CONNECTION PORT | any | BCMC ADDRESS | 20 | NONE | INSERT MPLS Shim HEADER (LABEL IS BC DOMAIN ID = 1), OUTPUT FROM FORWARDING NODE 200A CONNECTION PORT, TO TABLE #2 |
| 2 | EXTERNAL NODE 300C CONNECTION PORT | any | BCMC ADDRESS | 20 | NONE | INSERT MPLS Shim HEADER (LABEL IS BC DOMAIN ID = 2), OUTPUT FROM FORWARDING NODE 200A CONNECTION PORT, TO TABLE #2 |
| 3 | FORWARDING NODE 200A CONNECTION PORT | any | BCMC ADDRESS | any | 1 (BC DOMAIN ID) | DELETE MPLS Shim HEADER, CHANGE TO VLAN ID 20, OUTPUT FROM EXTERNAL NODE 300B CONNECTION PORT |
| 4 | FORWARDING NODE 200A CONNECTION PORT | any | BCMC ADDRESS | any | 2 (BC DOMAIN ID) | DELETE MPLS Shim HEADER, CHANGE TO VLAN ID 20, OUTPUT FROM EXTERNAL NODE 300C CONNECTION PORT |
| 5 | any | any | BCMC ADDRESS | any | any | Drop |

Table#2

| FLOW ENTRY NO. | In Port | L2 SOURCE ADDRESS | L2 DESTINATION ADDRESS | L2 VLAN ID | MPLS LABEL | INSTRUCTION |
|---|---|---|---|---|---|---|
| 1 | any | any | BCMC ADDRESS | any | any | Drop |

FIG. 15

Table#1

| FLOW ENTRY NO. | In Port | L2 SOURCE ADDRESS | L2 DESTINATION ADDRESS | L2 VLAN ID | MPLS LABEL | INSTRUCTION |
|---|---|---|---|---|---|---|
| 1 | EXTERNAL NODE 300D CONNECTION PORT | any | BCMC ADDRESS | 20 | NONE | INSERT MPLS Shim HEADER (LABEL IS BC DOMAIN ID = 2), OUTPUT FROM FORWARDING NODE 200A CONNECTION PORT, TO TABLE #2 |
| 2 | EXTERNAL NODE 300E CONNECTION PORT | any | BCMC ADDRESS | 30 | NONE | INSERT MPLS Shim HEADER (LABEL IS BC DOMAIN ID = 2), OUTPUT FROM FORWARDING NODE 200A CONNECTION PORT, TO TABLE #2 |
| 3 | FORWARDING NODE 200A CONNECTION PORT | any | BCMC ADDRESS | any | 2 (BC DOMAIN ID) | DELETE MPLS Shim HEADER, CHANGE TO VLAN ID 20, OUTPUT FROM EXTERNAL NODE 300D CONNECTION PORT, CHANGE TO VLAN ID 30, OUTPUT FROM EXTERNAL NODE 300E CONNECTION PORT |
| 4 | any | any | BCMC ADDRESS | any | any | Drop |

Table#2

| FLOW ENTRY NO. | In Port | L2 SOURCE ADDRESS | L2 DESTINATION ADDRESS | L2 VLAN ID | MPLS LABEL | INSTRUCTION |
|---|---|---|---|---|---|---|
| 1 | EXTERNAL NODE 300D CONNECTION PORT | any | BCMC ADDRESS | any | 2 (BC DOMAIN ID) | DELETE MPLS Shim HEADER, CHANGE TO VLAN ID 30, OUTPUT FROM EXTERNAL NODE 300E CONNECTION PORT |
| 2 | EXTERNAL NODE 300E CONNECTION PORT | any | BCMC ADDRESS | any | 2 (BC DOMAIN ID) | DELETE MPLS Shim HEADER, CHANGE TO VLAN ID 20, OUTPUT FROM EXTERNAL NODE 300D CONNECTION PORT |
| 3 | any | any | BCMC ADDRESS | any | any | Drop |

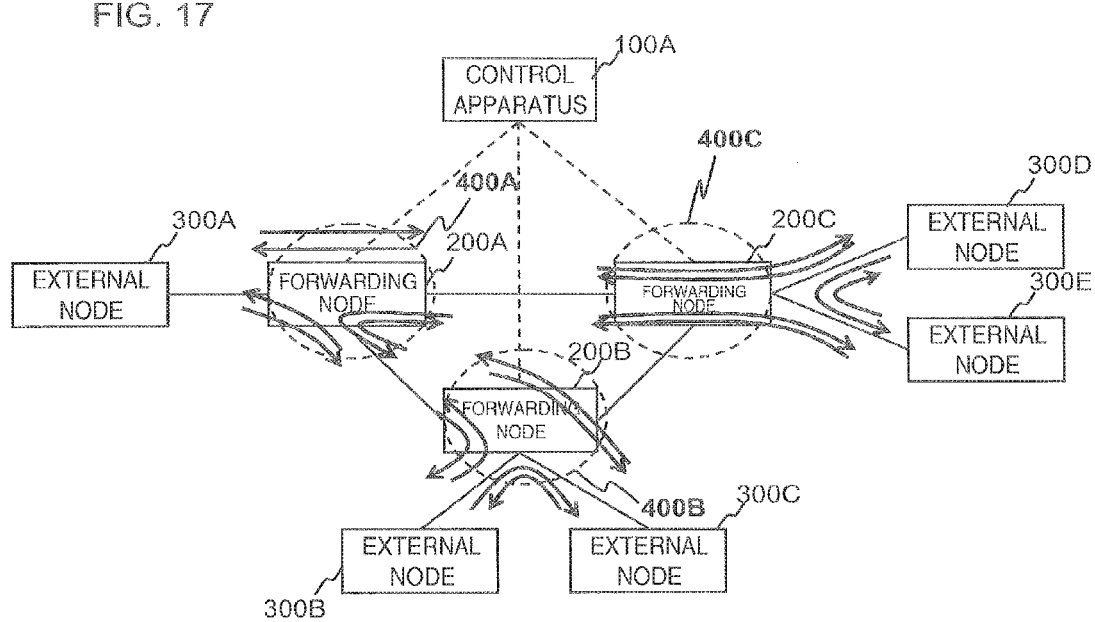

FIG. 18

| FLOW ENTRY NO. | In Port | L2 SOURCE ADDRESS | L2 DESTINATION ADDRESS | L2 VLAN ID | INSTRUCTION |
|---|---|---|---|---|---|
| 1 | EXTERNAL NODE 300A CONNECTION PORT | any | BCMC ADDRESS | any | OUTPUT FROM FORWARDING NODE 200B CONNECTION PORT, OUTPUT FROM FORWARDING NODE 200C CONNECTION PORT |
| 2 | FORWARDING NODE 200B CONNECTION PORT | any | BCMC ADDRESS | any | OUTPUT FROM EXTERNAL NODE 300A CONNECTION PORT, OUTPUT FROM FORWARDING NODE 200C CONNECTION PORT |
| 3 | FORWARDING NODE 200C CONNECTION PORT | any | BCMC ADDRESS | any | OUTPUT FROM EXTERNAL NODE 300A CONNECTION PORT, OUTPUT FROM FORWARDING NODE 200B CONNECTION PORT |
| 4 | any | any | BCMC ADDRESS | any | Drop |

FIG. 19

| FLOW ENTRY NO. | In Port | L2 SOURCE ADDRESS | L2 DESTINATION ADDRESS | L2 VLAN ID | INSTRUCTION |
|---|---|---|---|---|---|
| 1 | EXTERNAL NODE 300B CONNECTION PORT | any | BCMC ADDRESS | any | OUTPUT FROM EXTERNAL NODE 300C CONNECTION PORT, OUTPUT FROM FORWARDING NODE 200A CONNECTION PORT |
| 2 | EXTERNAL NODE 300C CONNECTION PORT | any | BCMC ADDRESS | any | OUTPUT FROM EXTERNAL NODE 300B CONNECTION PORT, OUTPUT FROM FORWARDING NODE 200A CONNECTION PORT |
| 3 | FORWARDING NODE 200A CONNECTION PORT | any | BCMC ADDRESS | any | OUTPUT FROM EXTERNAL NODE 300B CONNECTION PORT, OUTPUT FROM EXTERNAL NODE 300C CONNECTION PORT |
| 4 | any | any | BCMC ADDRESS | any | Drop |

FIG. 20

| FLOW ENTRY NO. | In Port | L2 SOURCE ADDRESS | L2 DESTINATION ADDRESS | L2 VLAN ID | INSTRUCTION |
|---|---|---|---|---|---|
| 1 | EXTERNAL NODE 300D CONNECTION PORT | any | BCMC ADDRESS | any | OUTPUT FROM EXTERNAL NODE 300E CONNECTION PORT, OUTPUT FROM FORWARDING NODE 200A CONNECTION PORT |
| 2 | EXTERNAL NODE 300E CONNECTION PORT | any | BCMC ADDRESS | any | OUTPUT FROM EXTERNAL NODE 300D CONNECTION PORT, OUTPUT FROM FORWARDING NODE 200A CONNECTION PORT |
| 3 | FORWARDING NODE 200A CONNECTION PORT | any | BCMC ADDRESS | any | OUTPUT FROM EXTERNAL NODE 300D CONNECTION PORT, OUTPUT FROM EXTERNAL NODE 300E CONNECTION PORT |
| 4 | any | any | BCMC ADDRESS | any | Drop |

SIGNAL PROCESSING APPARATUS AND SIGNAL PROCESSING METHOD THEREOF FOR IMPLEMENTING A BROADCAST OR A MULTICAST COMMUNICATION

FIELD

REFERENCE TO RELATED APPLICATION

This application is based upon and claims the benefit of the priority of Japanese Patent Application No. 2012-107595 filed on May 9, 2012, the disclosure of which is incorporated herein in its entirety by reference thereto.

The present invention relates to a communication system, a control apparatus, a communication method and a program, and in particular to a communication system, a control apparatus, a communication method and a program, which realize communication by forwarding nodes that forward received packets and the control apparatus that controls the forwarding nodes.

BACKGROUND

Patent Literatures (PTLs) 1 to 4 disclose methods of broadcasting or multicasting in a virtual network. Patent Literature 1 discloses a method of assigning an address of a carrier virtual Local Area Network (CVLAN) for a layer 2 network (below, "L2NW") for each physical port and VLAN, and assigning a broadcast or multicast address to each CVLAN, to realize broadcasting/multicasting.

In Patent Literature 2 there is provided a virtual hub that learns and stores relationships between a source MAC address inside a user MAC header in a received packet, and a terminal-side virtual interface through which the packet passes; and there is a disclosure of a packet routing method that uses an access router, which forwards the packet based on this stored information, and, on a network side, adds a VPN number, performs encapsulation in an IP packet and carries out transmission. In the same literature, broadcasting is realized by setting up a server for broadcasting, known as a packet copy server, and copying and forwarding to another access router within the same VPN (refer to paragraph 0122, seventh exemplary embodiment).

Patent Literature 3 discloses a node that adds an extension tag including forwarding information to a node on an exit side, to an input data frame, and performs forwarding. There is a description that when performing broadcasting, by setting forwarding information of a node on an input side (for example, a source MAC address) in the extension tag, data frames are relayed (claim 3, paragraphs 0129 and 0137).

Patent Literature 4 discloses a method of switching a packet by a transmission medium provided with a plurality of terminals connected using different links. The same literature has a description of preventing packet loops, by using an identifier list (broadcast control information) linked 1-to-1 with a switch through which frames pass (paragraphs 0038 to 0040).

Non-Patent Literatures (NPLs) 1 and 2 disclose a network in which communication is taken as end-to-end flow, and which includes switches called "OpenFlow switches" that process flows thereof, and a controller that sets control information known as "flow entries" for the switches.
PTL 1:
Japanese Patent Kokai Publication No. JP2000-286853A
PTL 2:
Japanese Patent Kokai Publication No. JP2002-247089A
PTL 3:
Japanese Patent Kokai Publication No. JP2004-266874A
PTL 4:
Japanese Patent Kohyo Publication No. 2007-534191A
NPL 1:
Nick McKeown et al., "OpenFlow: Enabling Innovation in Campus Networks," [online], [search carried out on Mar. 14, 2012], Internet <URL: http://www.openflow.org/documents/openflow-wp-latest.pdf>.
NPL 2:
"OpenFlow Switch Specification, Version 1.0.0. Implemented (Wire Protocol 0x02)," [online], [search carried out on Mar. 14, 2012], Internet <URL:http.//www.openflow.org/documents/openflow-spec-v1.1.0.pdf>.

SUMMARY

The following analysis is given according to the present invention. As described in paragraph 0005 of Patent Literature 1 and paragraph 0016 of Patent Literature 2, a VLAN header defined by IEEE 802.1 has a length of 12 bits, and there is a problem in that the number of VLANs that can be identified is limited to 4,096.

In an OpenFlow network in Non-Patent Literatures 1 and 2, by performing conversion of VLAN IDs of input or output packets with regard to outside a network in accordance with a flow entry in a switch located at an edge, it is possible to increase the number of VLANs that can be handled by the network to 4,096 or more.

However, in a case where the number of VLANs is increased to 4,096 or more by this method and broadcasting or multicasting (called "BCMC" below) is performed, while one end-to-end flow is adequate for unicast flow, flow entries of (number of ends)×(number of ends) are necessary for broadcast or multicast flow. Furthermore, since this method requires flows for broadcast and multicast to be similar in number to that of broadcast and multicast domains to be handled by an OpenFlow network, there is a problem in that, along with an increase in the number of endpoints of broadcast and multicast domains and along with an increase in the number of broadcast and multicast domains, the number of flow entries of a flow processing apparatus dramatically increases.

Therefore, the following method, for example, may be considered. Setting of broadcast or multicast flow entries in an OpenFlow network as shown in FIG. 16 may be considered. Accordingly, in order to implement a spanning tree requiring that broadcast or multicast packets do not loop, as shown in FIG. 17, broadcast or multicast flow entries (referred to below as "BCMC base flow entries," with reference symbols 400A to 400C attached) that do not depend on VLAN ID, are set in each forwarding node.

FIG. 18 to FIG. 20 are examples of BCMC base flow entries 400A to 400C to be set in respective forwarding nodes of FIG. 17, and setting is performed with regard to flow entries corresponding to arrows in FIG. 17 and flow entries to drop packets that could loop. By using such BCMC base flow entries 400A to 400C, it is possible to cope with the problem of an increase in the number of flow entries for each broadcast or multicast domain. A forwarding node located at an edge of the network does not perform conversion of VLAN ID of input or output packets with regard to an outside network, but processes packets using a VLAN setting for ports of the relevant forwarding node as in the following, for example. Specifically, in a case where a VLAN ID is set with a port being untagged, a forwarding node located at the edge receives a packet in a state in which the set VLAN ID from the port in question is tagged only in a case where the input packet is untagged, and performs processing to drop the input packet at the port in question in a case where the input packet is tagged. On the other hand, in a case where the VLAN ID is set with the port being tagged, a forwarding node located at the edge receives a packet in a state in which the VLAN ID from the port in question is tagged only in a case where the VLAN ID of the input packet is the same, and performs processing to drop the input packet at the port in question in a case where the input packet is untagged or has a different VLAN ID.

In a case where a VLAN ID is set with a port being untagged, a forwarding node located at the edge outputs a packet in a state in which the VLAN ID is untagged from the port in question only in a case where the VLAN ID of the output packet is the same, and performs processing to drop the output packet at the port in question in a case where the VLAN ID is different. On the other hand, in a case where a VLAN ID is set with the port in question being tagged, a forwarding node located at the edge outputs a packet in a state in which the VLAN ID is tagged from the port in question only in a case where the VLAN ID of the output packet is the same, and performs processing to drop the output packet at the port in question where the VLAN ID is different.

When a broadcast or multicast domain in the OpenFlow network in this case is, for example, a combination of a virtual L2SW 502A and external NW endpoints 503A and 503B of a virtual network 500A shown in FIG. 21, the same VLAN ID is used in the same broadcast domain or multicast domain, as in a combination of a virtual L2SW 502B and external NW endpoints 503C to 503E. It is to be noted that the external NW endpoint 503A in FIG. 21 indicates that the port to which an external node 300A of a forwarding node 200A is connected in FIG. 17, is untagged, and the VLAN ID is 10. Similarly, the external NW endpoint 503B in FIG. 21 indicates that the port to which an external node 300B of a forwarding node 200B is connected in FIG. 17, is tagged and the VLAN ID is 10, and the external NW endpoint 503C indicates that the port to which an external node 300C of a forwarding node 200B is connected in FIG. 17, is tagged and the VLAN ID is 20. Similarly, the external NW endpoint 503D indicates that the port to which an external node 300D of a forwarding node 200C is connected in FIG. 17, is tagged and the VLAN ID is 20, and the external NW endpoint 503E indicates that the port to which an external node 300E of a forwarding node 200C is connected in FIG. 17, is tagged and the VLAN ID is 20. In this way, by using the same VLAN ID for the same broadcast domain or multicast domain, and by using the VLAN settings of ports of forwarding nodes located at edges, it is possible to cope with the problem of an increase in the number of flow entries due to an increase in the number of endpoints of a broadcast or multicast domain.

However, with this method, if it is attempted to use the same VLAN ID in different broadcast or multicast domains, since it is not possible to the distinguish broadcast domains or multicast domains in a flow network, it is thus not possible to use the same VLAN ID in different broadcast or multicast domains. Therefore, the number of VLANs that can be handled in the flow network is limited to 4,096.

As described above, in the OpenFlow network of Non-Patent Literatures 1 and 2, if a broadcast or a multicast is implemented, there is a problem in that either an increase in flow entries or a limitation to the number of VLANs becomes a constraint.

On the other hand, according to a method of Patent Literature 1, it is possible to handle VLANs exceeding the upper limit of 4,096 in the number of VLANs as described above, but since a broadcast or multicast address is assigned for each CVLAN, it is necessary to have a huge number of entries, similar to the abovementioned OpenFlow network.

According to a method of Patent Literature 2, besides a broadcast server, known as a packet copy server, being necessary, corresponding traffic is generated between an IP network and the packet copy server.

In a method of Patent Literature 3 also, since a source MAC address is set in a forwarding tag, there is a possibility of the number of entries becoming very large, in the same way as the method of Patent Literature 1.

Therefore, there is a need in the art implement, in the OpenFlow network of Non-Patent Literatures 1 and 2, a broadcast or a multicast without being constrained by the number of VLAN IDs defined by IEEE 802.1 and with fewer flow entries.

According to a first aspect, there is provided a communication system. The communication system comprises: a control apparatus that sets broadcast domains or multicast domains respectively for virtual networks configured in a physical network including a forwarding node(s), and sets, in the forwarding node(s), broadcast or multicast control information, associating a packet forwarding destination and a match condition including an identifier for identifying one of the broadcast domains or multicast domains; and the forwarding node(s) that performs a broadcast or multicast using the broadcast or multicast control information.

According to a second aspect, there is provided a control apparatus that sets broadcast domains or multicast domains respectively for virtual networks configured in a physical network including a forwarding node(s), and sets, in the forwarding node(s), broadcast or multicast control information associating a packet forwarding destination and a match condition including an identifier for identifying one of the set broadcast domains or multicast domains.

According to a third aspect, there is provided a communication method. The communication method comprises: setting broadcast domains or multicast domains respectively for virtual networks configured in a physical network including a forwarding node(s); setting, in the forwarding node(s), broadcast or multicast control information associating a packet forwarding destination and a match condition including an identifier for identifying one of the broadcast domains or multicast domains; and causing the forwarding node(s) to execute a broadcast or multicast using the broadcast or multicast control information. This method is associated with a particular machine known as a computer, which controls forwarding nodes.

According to a fourth aspect, there is provided a program that causes a computer, configuring a control apparatus that sets control information in a forwarding node(s), to execute: setting broadcast domains or multicast domains respectively for virtual networks configured in a physical network including the forwarding node(s); and setting, in the forwarding node(s), broadcast or multicast control information associating a packet forwarding destination and a match condition including an identifier for identifying the broadcast domains or multicast domains. This program may be recorded on a computer-readable (non-transient) storage medium. That is, the present invention may be embodied as a computer program product.

The present invention provides the following advantage, but not restricted thereto. According to the present invention, it is possible to implement in the OpenFlow network of Non-Patent Literatures 1 and 2 a broadcast or a multicast without being constrained by the number of VLAN IDs, and with fewer flow entries.

BRIEF DESCRIPTION OF THE DRAWINGS

FIG. 6 is a diagram showing flow entries set in a forwarding node 200A by the control apparatus of the first exemplary embodiment of the present invention.

FIG. 7 is a diagram showing flow entries set in a forwarding node 200B by the control apparatus of the first exemplary embodiment of the present invention.

FIG. 8 is a diagram showing flow entries set in a forwarding node 200C by the control apparatus of the first exemplary embodiment of the present invention.

FIG. 13 is a diagram showing flow entries set in the forwarding node 200A by the control apparatus of the second exemplary embodiment of the present invention.

FIG. 14 is a diagram showing flow entries set in the forwarding node 200B by the control apparatus of the second exemplary embodiment of the present invention.

FIG. 15 is a diagram showing flow entries set in the forwarding node 200C by the control apparatus of the second exemplary embodiment of the present invention.

FIG. 17 is a diagram for describing a broadcast or a multicast in the OpenFlow network of Non-Patent Literatures 1 and 2.

FIG. 18 is a diagram showing flow entries set in the forwarding node 200A of FIG. 16.

FIG. 19 is a diagram showing flow entries set in the forwarding node 200B of FIG. 16.

FIG. 20 is a diagram showing flow entries set in the forwarding node 200C of FIG. 16.

PREFERRED MODES

Figure 1:
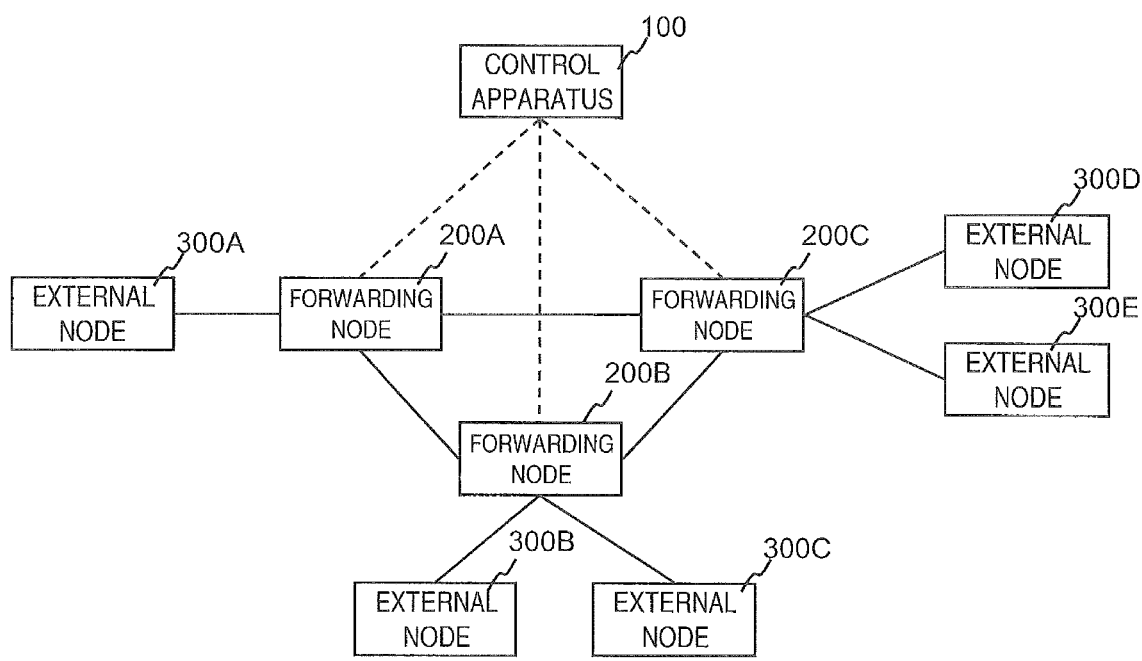
FIG. 1 is a diagram showing a configuration of a first exemplary embodiment of the present invention.

In the present disclosure, there are various possible modes, which include the following, but not restricted thereto. First, a description is given of an outline of an exemplary embodiment of the present invention, making reference to the drawings. It is to be noted that reference symbols in the drawings attached to this outline are added to respective elements for convenience, as examples in order to aid understanding, and are not intended to limit the present invention to modes illustrated in the drawings.

The present invention, in an exemplary embodiment thereof, can be implemented by a configuration comprising: a control apparatus 100 that sets control information for a broadcast or multicast in forwarding nodes 200A to 200C, and the forwarding nodes 200A to 200C that perform a broadcast or multicast using the broadcast or multicast control information, as shown in FIG. 1.

More specifically, the control apparatus 100 sets broadcast domains or multicast domains respectively for virtual networks configured in a physical network including the forwarding nodes 200A to 200C (refer to FIG. 3), and sets, in the forwarding nodes, broadcast or multicast control information associating a packet forwarding destination and a match condition including an identifier for identifying one of the broadcast domains or multicast domains.

Figure 16:
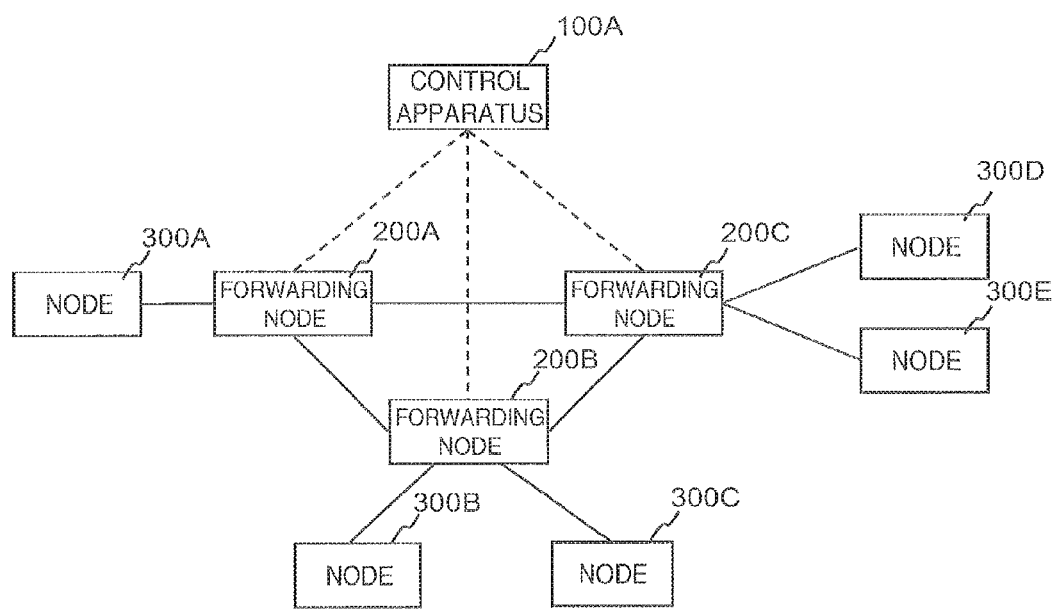
FIG. 16 is a diagram showing a configuration of an OpenFlow network of Non-Patent Literatures 1 and 2.
Figure 21:
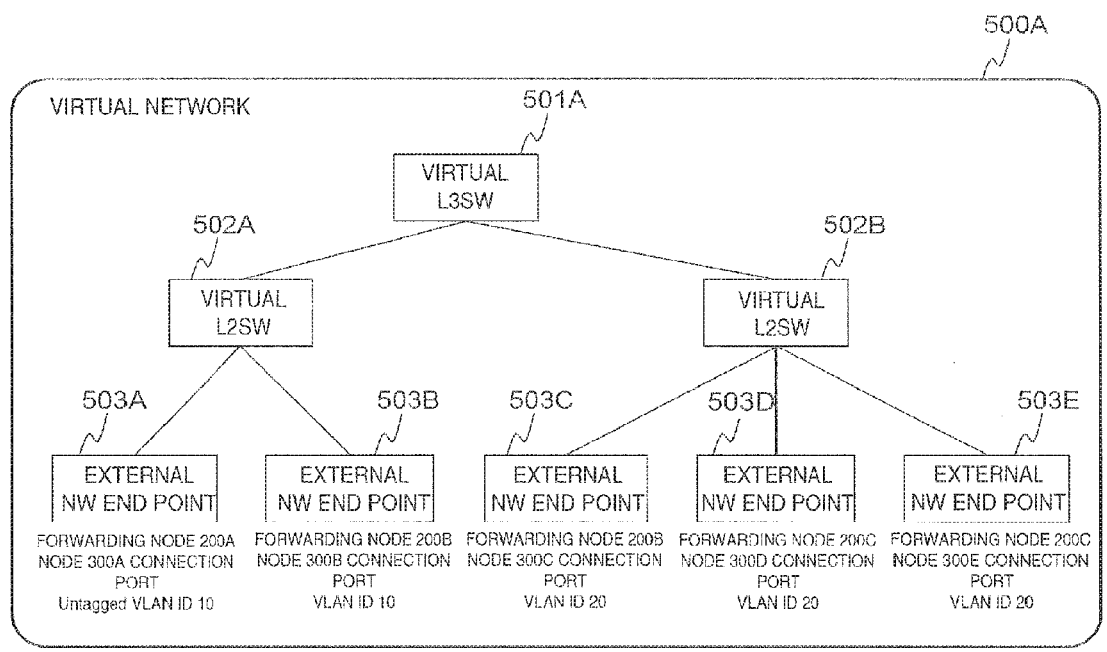
FIG. 21 is an example of a virtual network configured by the OpenFlow network of Non-Patent Literatures 1 and 2.

It is to be noted that, as a method of calculating a packet forwarding path for a broadcast or a multicast, it is possible to use a method of obtaining a spanning tree such that broadcast and multicast packets do not loop, as described using the abovementioned FIG. 16 and FIG. 17.

<First Exemplary Embodiment>

Next, a detailed description is given concerning a first exemplary embodiment of the present invention, making reference to the drawings. FIG. 1 is a diagram showing a configuration of the first exemplary embodiment of the present invention. Referring to FIG. 1, a configuration is shown that includes a network configured by a plurality of forwarding nodes 200, and a control apparatus 100 that controls the forwarding nodes 200A to 200C, and realizes communication with external nodes 300A to 300E. Below, where the forwarding nodes 200A to 200C and the external nodes 300A to 300E are not particularly distinguished, they are denoted "forwarding node 200" and "external node 300," respectively.

The control apparatus 100 performs path control for packets between one of the external nodes 300 and another of the external nodes 300 by setting a flow entry for forwarding node(s) 200 in the path. On receiving a packet from an external node 300 or another forwarding node 200, the forwarding node 200 searches for a flow entry having a match condition matching the received packet, among flow entries set by the control apparatus 100, and performs processing of the received packet in accordance with the relevant flow entry. As processing content set in the flow entry, forwarding to the external node 300 or another forwarding node 200, outputting to the control apparatus 100, dropping and the like are performed.

One of the external nodes 300 (for example, external node 300A) transmits a packet addressed to another of the external nodes 300 (for example, external node 300D or external node 300E) to a forwarding node 200, or receives a packet with another of the external nodes 300 as a source, from a forwarding node 200.

Here, a forwarding node 200 connected to an external node 300 is an "edge forwarding node 200," and a forwarding node 200 connected only to a forwarding node 200 is a core forwarding node. There may be a case where, according to the network, there is no core forwarding node, and in the example of FIG. 1, a core forwarding node is not present. An external node 300 need not be directly connected to an edge forwarding node, and may be connected via a legacy apparatus such as an L2SW (Layer 2 Switch) that is not directly controlled by the control apparatus 100; an external node 300 may be an L3SW or a router, and a separate external node 300 may be present ahead of this.

The present exemplary embodiment also uses BCMC base flow entries as shown in FIG. 17 to FIG. 20. It is to be noted that in the example of FIG. 17, a flow entry for forwarding between the forwarding nodes 200B and 200C is not set, but this is in order that broadcast and multicast packets are loop-free within the network. Each time a network configuration or state changes, BCMC path(s) and BCMC base flow entry(ies) are changed. Here, a BCMC address is a broadcast or multicast address. For example, in a case of a MAC address, 1 is set in the I/G bit of the first byte.

Figure 2:
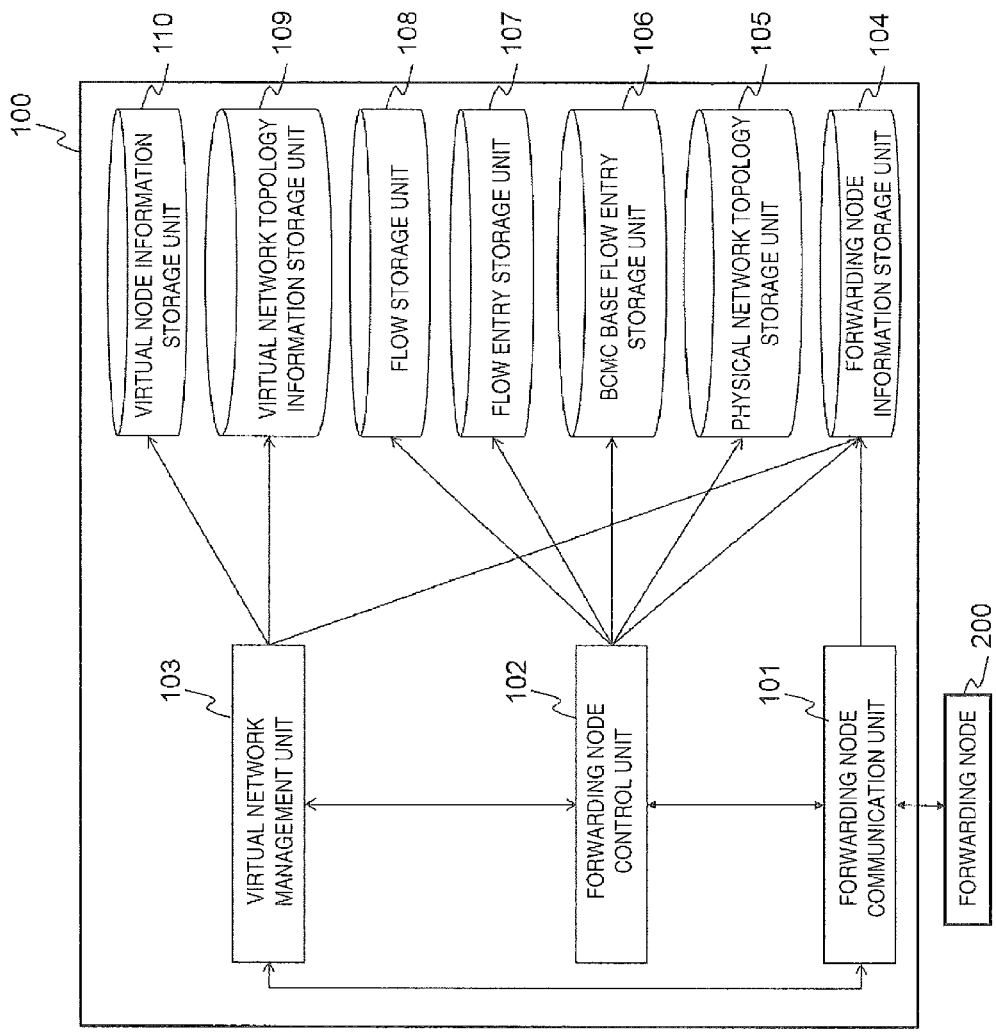
FIG. 2 is a block diagram showing a configuration of a control apparatus in the first exemplary embodiment of the invention.

FIG. 2 is a block diagram representing a detailed configuration of the control apparatus 100 in the present exemplary embodiment. Referring to FIG. 2, the control apparatus 100 is configured by being provided with: a forwarding node communication unit 101, a forwarding node control unit 102, a virtual network management unit 103, a forwarding node information storage unit 104, a physical network topology storage unit 105, a BCMC base flow entry storage unit 106, a flow entry storage unit 107, a flow storage unit 108, a virtual network topology information storage unit 109, and a virtual node information storage unit 110.

The forwarding node communication unit 101 relays forwarding node information and input packet information from a forwarding node 200 to the forwarding node control unit 102 or the virtual network management unit 103. The forwarding node communication unit 101 refers to the forwarding node information storage unit 104 and relays to a forwarding node 200: output packet information from the virtual network management unit 103, setting instruction(s) with regard to flow entries from the forwarding node control unit 102, request(s) to refer to flow entries, request(s) to refer to forwarding node information from the virtual network management unit 103 and the forwarding node control unit 102, or the like.

The forwarding node control unit 102 records forwarding node information received via the forwarding node communication unit 101 in the forwarding node information storage unit 104. The forwarding node control unit 102 comprehends the network topology, based on information of the forwarding node information storage unit 104 and the input packet information, and updates the network topology information of the physical network topology storage unit 105.

The forwarding node control unit 102 obtains a path that is to be a base for broadcast and multicast packets, based on the network topology information, and generates a BCMC base flow entry 400 for broadcast and multicast for each forwarding node 200 implementing the path, to be stored in the BCMC base flow entry storage unit 106.

The forwarding node control unit 102 obtains BCMC flow entries from the BCMC base flow entries, and virtual node information and virtual network topology information from the virtual network management unit 103, to be stored in the flow entry storage unit 107, in addition to setting the flow entries in a forwarding node 200 through the forwarding node communication unit 101. Furthermore, the forwarding node control unit 102 obtains flow entries from flow setting information and network topology information received from the virtual network management unit 103, stores the flow entries in the flow entry storage unit 107, and sets the flow entries in the forwarding node 200 through the forwarding node communication unit 101.

The virtual network management unit 103 is connected to the virtual node information storage unit 110 that stores virtual node information in a plurality of virtual networks, and the virtual network topology information storage unit 109 that stores connection relationships of virtual nodes for each of a plurality of virtual networks, and manages the virtual networks. The virtual network management unit 103 passes the virtual node information and the virtual network topology information to the forwarding node control unit 102.

On receiving input packet information from the forwarding node 200 via the forwarding node communication unit 101, the virtual network management unit 103 processes the input packet information based on the virtual network topology information. More specifically, the virtual network management unit 103 performs processing such as dropping input packet information, reception by virtual nodes such as a virtual L3SW (refer to virtual L3SW 501A of FIG. 3), output of output packet information from virtual nodes such as an external NW endpoint (refer to external NW endpoints 503A to 503E), based on input packet information and information of the abovementioned virtual node information storage unit 110 and the virtual network topology information storage unit 109. It is to be noted that output of the output packet information is performed not only on receipt of input packet information from the forwarding node communication unit 101, but also at host transmission of a virtual node such as a virtual L3SW (refer to virtual L3SW 501A of FIG. 3). The virtual network management unit 103 outputs the output packet information to the forwarding node 200 through the forwarding node communication unit 101.

In addition, the virtual network management unit 103 may make a request, to the forwarding node control unit 102, for flow setting according to flow setting information based on: input packet information from the forwarding node communication unit 101 and drop information corresponding thereto, or input packet information from the forwarding node communication unit 101 and output of the output packet information to the forwarding node communication unit 101 corresponding thereto. It is to be noted that it is also possible for the virtual network management unit 103 to make a flow setting request to the forwarding node control unit 102 from the virtual network topology information or the like.

The forwarding node information storage unit 104 stores information of each of the forwarding nodes 200. As information stored in the forwarding node information storage unit 104, forwarding node port information, VLAN setting information, forwarding node performance, and addresses for accessing forwarding nodes, for example, may be cited. In addition to this, statistical information or the like may be included.

The physical network topology storage unit 105 stores network topology information representing connection relationships among the forwarding nodes 200.

The BCMC base flow entry storage unit 106 holds flow entries for respective forwarding nodes 200 as a basis for broadcast or multicast flow in the network. For example, in a case where a broadcast or multicast flow is set among the forwarding nodes 200A to 200C as shown by arrows in FIG. 17, the BCMC base flow entry storage unit 106 stores BCMC base flow entries of FIG. 18 to FIG. 20 generated in correspondence thereto.

The flow entry storage unit 107 stores flow entries set in the forwarding nodes 200.

The flow storage unit 108 stores flow setting information such as processing and path determined for each flow. The flow setting information includes, for example, information of match conditions for identifying flows, states of packets when outputted from a flow termination point in a network, external NW endpoints when a packet is inputted to a network (refer to external NW endpoints 503A to 503E of FIG. 3), external NW endpoints when outputted (refer to external NW endpoints 503A to 503E of FIG. 3), and the like.

The virtual network topology information storage unit 109 holds information of connections among virtual nodes for each virtual network 500A.

The virtual node information storage unit 110 stores virtual node information such as that of a virtual L3SW (refer to virtual L3SW 501A of FIG. 3) or a virtual L2SW (refer to virtual L2SW 502A and 502B of FIG. 3), and external NW endpoints (external NW endpoints 503A to 503E of FIG. 3), for each virtual network. The virtual node information concerns, for example, for a case of a virtual L3SW (refer to virtual L3SW 501A of FIG. 3), information similar to that of an L3SW such as virtual interface information, routing table information, ARP (Address Resolution Protocol) entry information, and the like, and relationships with the virtual network 500A. Furthermore, for example, for a case of a virtual L2SW (refer to virtual L2SW 502A and 502B in FIG. 3), information similar to that of an L2SW such as virtual interface information or entry information of a MAC forwarding table, broadcast domain IDs (BC domain IDs) for uniquely distinguishing a broadcast domain, and also relationships with the virtual network 500A are stored. In a case of an external NW endpoint (refer to external NW endpoints 503A to 503E in FIG. 3), information regarding which VLAN IDs have a relationship, and for which ports of which forwarding nodes 200 in the network managed by the control apparatus 100, and also relationships with the virtual network 500A are stored. It is to be noted that information is stored regarding whether VLAN ID information of external NW endpoints (refer to external NW endpoints 503A to 503E in FIG. 3) is untagged or tagged; if untagged, whether or not a VLAN ID for untagged use is to be used; if used, which VLAN ID; and if tagged, which VLAN ID.

Figure 3:
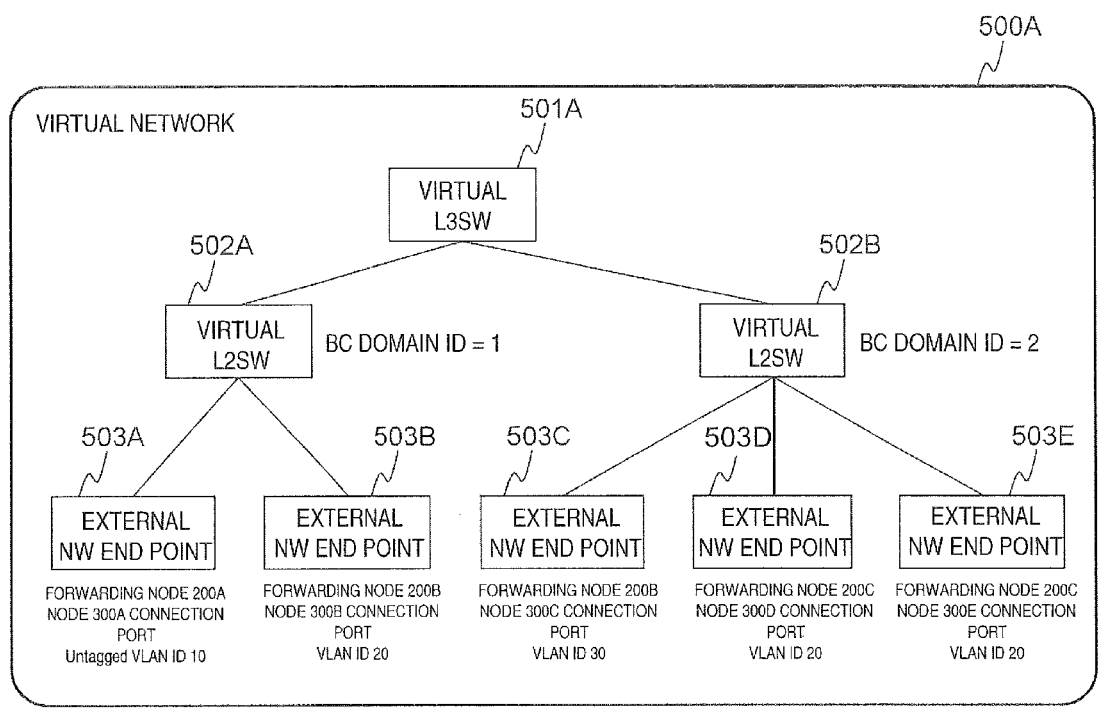
FIG. 3 is a diagram showing a configuration of a virtual network configured by the control apparatus of the first exemplary embodiment of the invention.

FIG. 3 shows an example of a virtual network provided according to the control apparatus 100 of the present exemplary embodiment. The virtual L3SW 501A, virtual L2SW 502A and 502B, and external NW endpoints 503A to 503E are present as virtual nodes in the virtual network 500A; the virtual L3SW 501A and virtual L2SW 502A and 502B are connected as virtual network topology; the virtual L2SW 502A and external NW endpoints 503A and 503B are connected; and virtual L2SW 502B and external NW endpoints 503C to 503E are connected. The virtual L2SW 502A has 1 as a BC domain ID, and the virtual L2SW 502 has 2 as a BC domain ID. It is to be noted that it is sufficient if assignment of a BC domain ID is such that the virtual network management unit 103 can uniquely identify the virtual L2SW 502.

Figure 4:
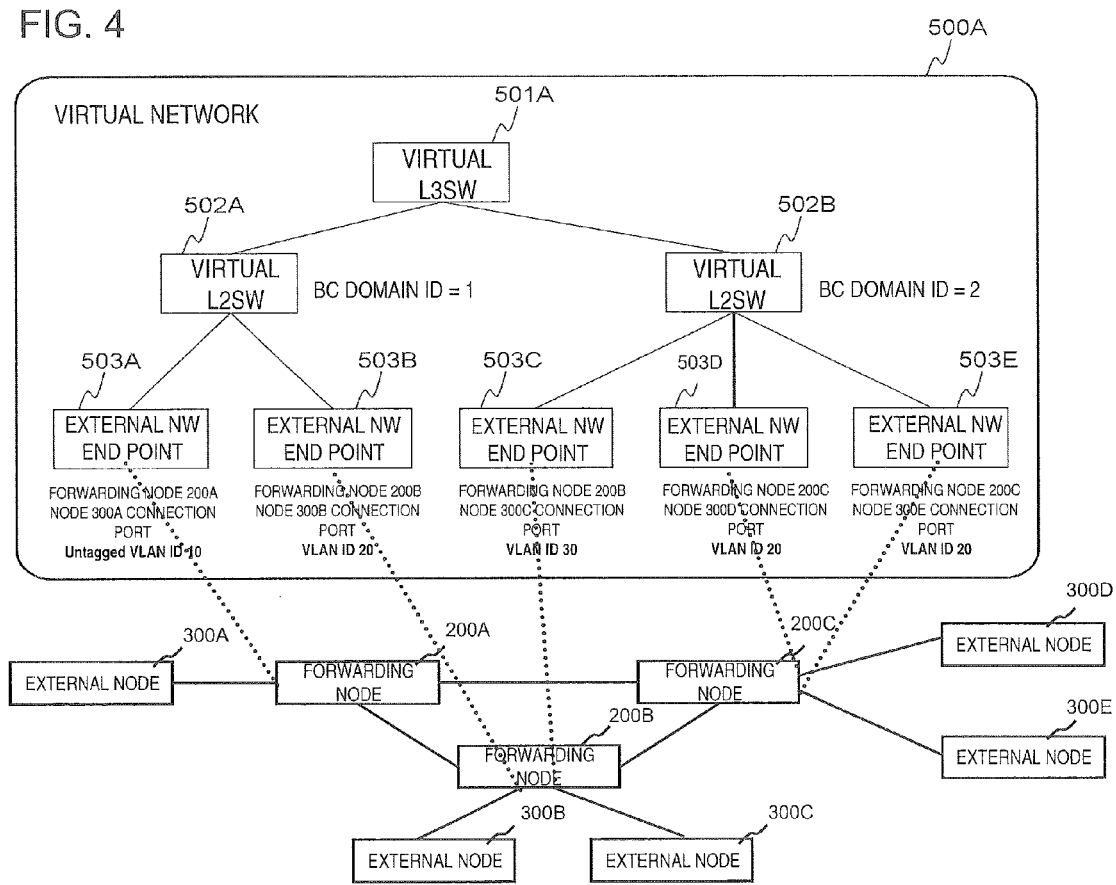
FIG. 4 is a diagram showing correspondence relationships between FIG. 1 and FIG. 3.

Here, the virtual network 500A corresponds to the physical network of FIG. 1, as shown in FIG. 4 (dashed lines in FIG. 4 indicate correspondence relationships between physical and virtual); the external NW endpoint 503A corresponds to an untagged port with a VLAN ID of 10 at an external node 300A connection port of the forwarding node 200A. In the same way, the external NW endpoint 503B corresponds to a tagged port with a VLAN ID of 20 at the external node 300B connection port of the forwarding node 200B; and the external NW endpoint 503C corresponds to a tagged port with a VLAN ID of 30 at the external node 300C connection port of the forwarding node 200B. Furthermore, the external NW endpoint 503D corresponds to a tagged port with a VLAN ID of 20 at the external node 300D connection port of the forwarding node 200C; and the external NW endpoint 503E corresponds to a tagged port with a VLAN ID of 20 at the external node 300E connection port of the forwarding node 200C.

Figure 5:
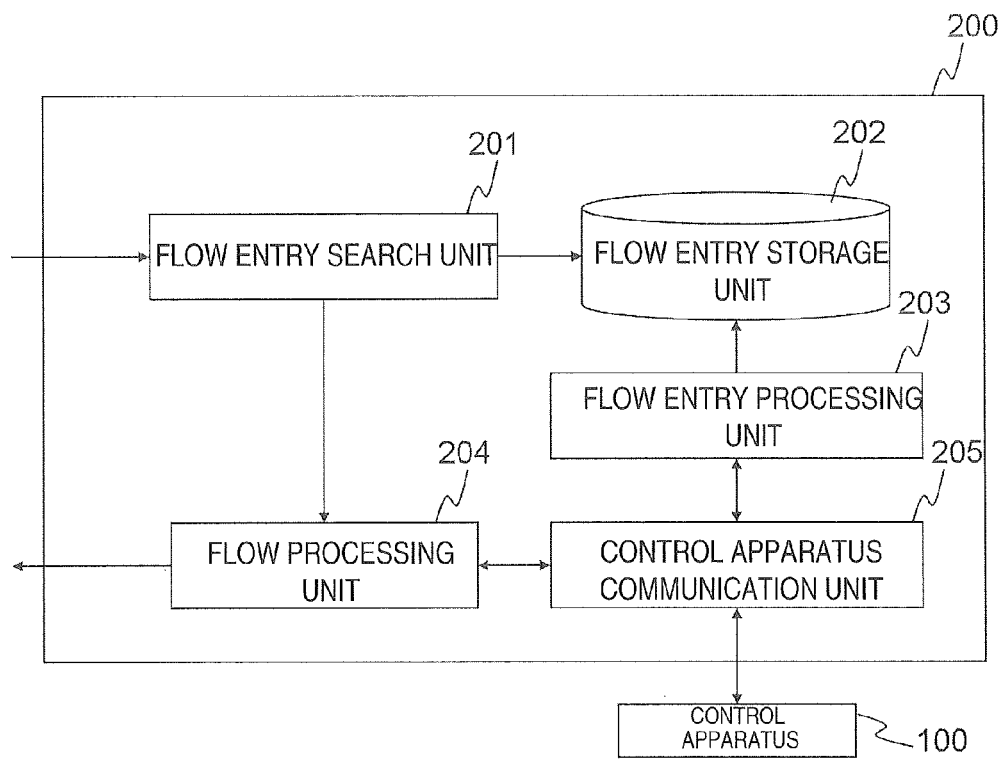
FIG. 5 is a block diagram showing a configuration of a forwarding node in the first exemplary embodiment of the invention.

FIG. 5 is a block diagram showing a detailed configuration of a forwarding node 200. Referring to FIG. 5, the forwarding node 200 is configured by being provided with a flow entry search unit 201, a flow entry storage unit 202, a flow entry processing unit 203, a flow processing unit 204, and a control apparatus communication unit 205.

The flow entry search unit 201 extracts flow entry search condition information in order to search for a flow entry from received packets, and searches the flow entry storage unit 202 using the flow entry search condition information. As a result of the search if there is a matching flow entry, the flow entry search unit 201 updates timeout time and statistical information thereof. The flow entry search unit 201 passes processing content (instruction or action set) determined in the matching flow entry, and the input packet to the flow processing unit 204.

The flow entry storage unit 202 holds a flow entry that has been set by the forwarding node control unit 102 of the control apparatus 100. Here, the flow entry held by the flow entry storage unit 202 is synchronized with a flow entry held in the flow entry storage unit 107 of the control apparatus 100.

On receiving a reference instruction or a setting instruction such as to add or delete a flow entry from the control apparatus 100 through the control apparatus communication unit 205, the flow entry processing unit 203 performs the relevant processing on the flow entry storage unit 202. The flow entry processing unit 203 refers to the flow entry storage unit 202, deletes flow entries that have timed out, and notifies the control apparatus 100 that the flow entries in question have been deleted, through the control apparatus communication unit 205.

The flow processing unit 204 processes packets in accordance with processing content to be applied to an input packet passed from the flow entry search unit 201 or the control apparatus 100. Specifically, modification of packet header information, forwarding to an external node 300 or another forwarding node 200, outputting to the control apparatus 100, dropping, and the like are performed.

The control apparatus communication unit 205 relays between the control apparatus 100, and the flow entry processing unit 203 or the flow processing unit 204.

FIG. 6 to FIG. 8 show examples of BCMC base flow entries respectively set in the forwarding nodes 200A to 200C, in order to perform a broadcast or a multicast, in the virtual network 500A of FIG. 3. It is to be noted that in the examples of FIG. 6 to FIG. 8, in a case where two tables are used and the forwarding node receives a packet from an external node 300, pipeline processing is performed, making reference to the second table (Table #2) in accordance with an instruction of the first table (Table #1) (refer to "4.1.1 Pipeline Processing" of Non-Patent Literature 2). FIG. 6 to FIG. 8 are merely examples; there may be 1 or more flow tables, and the flow entries also may be divided.

It is assumed that when packets are outputted from a port of a forwarding node 200, the forwarding node 200 performs processing indicated in (1) and (2) below, based on VLAN setting information that has been set in the relevant port.

(1) In a case where a VLAN ID is set with a port being untagged, the forwarding node 200 receives a packet in a state in which the set VLAN ID from the port in question is tagged only in a case where the input packet is untagged, and performs processing to drop the input packet at the port in question in a case where the input packet is tagged. On the other hand, in a case where a VLAN ID is set with a port being tagged, a forwarding node receives a packet in a state in which the VLAN ID from the port in question is tagged only in a case where the VLAN ID of the input packet is the same, and performs processing to drop the input packet at the port in question in a case where the input packet is untagged or the VLAN ID is different.

(2) In a case where a VLAN ID is set with the port of the forwarding node 200 being untagged, the forwarding node 200 outputs a packet in a state in which the VLAN ID from the port in question is untagged only in a case where the VLAN ID of the output packet is the same, and performs processing to drop the output packet at the port in question in a case where the VLAN ID is different. On the other hand, in a case where a VLAN ID is set, with the port in question being tagged, a packet is outputted in a state in which the VLAN ID from the port in question is tagged only in a case where the VLAN ID of the output packet is the same, and performs processing to drop the output packet at the port in question when the output packet has a different VLAN ID. It is of course assumed that appropriate VLAN information is set at the port of the forwarding node 200.

Moreover, in the BCMC base flow entries of FIG. 6 to FIG. 8, in order to enable handling of 4,096 or more VLANs, a MPLS (Multi-Protocol Label Switching) Shim header is inserted into the packet, an MPLS label is a BC domain ID, and this information forms a match condition for flow entries. In this case, since the MPLS label is 20 bits, it is possible to handle VLANs of $2^{20}$ (1,048,576) in number for a broadcast or a multicast. It is to be noted that this method of increasing the number of VLANs is an example, and it is also possible to further increase the number by stacking MPLS Shim headers for BC domain IDs. VLAN header(s) may be deleted at the same time as when MPLS Shim headers are inserted (in this case, VLAN header(s) may be inserted (restored) at a time of deletion of MPLS Shim headers at a network exit). It is also possible to encapsulate packets with a VLAN header or MAC header and to apply a BC domain ID to a source address in an external MAC address; and it is also possible to encapsulate packets with a MPLS Shim header and to apply a BC domain ID to an MPLS label.

It is to be noted that the BCMC flow entries in FIG. 6 to FIG. 8 are examples, and there is no problem in adding "forwarding node 200C connection port output" to an instruction of flow entry No. 1 in the second flow table (Table #2) in FIG. 6, as in BCMC base flow entries in FIG. 18 to FIG. 20. In the same way, there is no problem in adding "external node 300C connection port output" to an instruction of flow entry No. 3 in the first flow table (Table #1) in FIG. 7, since the VLAN setting of a port of the forwarding node 200B is used; and there is no problem in adding "external node 300B connection port output" to an instruction of flow entry No. 1 in the first flow table (Table #1) in FIG. 7, since the VLAN setting of a port of the forwarding node 200B is used. In a case where a VLAN setting of a port of the forwarding node 200 is untagged and there is no VLAN ID setting, a packet may be received in an untagged state from the port in question only in a case where the input packet is untagged, and in a case where the input packet is tagged, processing may be performed to drop the input packet at the port in question. In a case of outputting the packet in an untagged state from the port in question only in a case where the output packet is untagged, and processing is performed to drop the output packet at the port in question when tagged, as examples: "modification in VLAN ID 10" by an instruction of flow entry No. 2 in the first flow table (Table #1) of FIG. 6 is "delete VLAN header"; a layer 2 VLAN ID in a match condition of flow entry No. 1 in the second flow table (Table #2) of FIG. 6 is "none"; and an instruction is "insert VLAN header (VLAN ID is not defined)" at the start.

"Forwarding node 200C connection port output" and "forwarding node 200B connection port output" in instructions of flow entries No. 1 and No. 2 in the first flow table (Table #1) of FIG. 7 are set using information of base flow entries No. 1 and No. 2 of FIG. 19. In a state of FIG. 3, forwarding of BC packets of the external node 300C connection port from the virtual L2 SW 502A is not necessary, but by using information of base flow entries as described above, in a case where the external NW endpoint 503 having VLAN ID 10 is newly connected to the virtual L2SW 502A, the flow entries need not be newly set. Clearly, in a case where there is no addition of the external NW endpoint 503 or the like and there is no change in the virtual network configuration, or a case where an operation is performed to update a flow entry whenever there is a change in the configuration of the virtual network, it is possible to omit "forwarding node 200C connection port output" and "forwarding node 200B connection port output" in an instruction of flow entries No. 1 and No. 2 in the first flow table (Table #1) of FIG. 7.

It is to be noted that the abovementioned forwarding node 200 can be implemented as an OpenFlow switch of Non-Patent Literatures 1 and 2. The control apparatus 100 can be implemented by adding the abovementioned respective functions, based on an OpenFlow controller of Non-Patent Literatures 1 and 2.

The respective parts (processing means) of the abovementioned control apparatus 100 can be implemented by a computer program that executes the abovementioned respective processing on a computer configuring the control apparatus 100, using hardware thereof.

Figure 9:
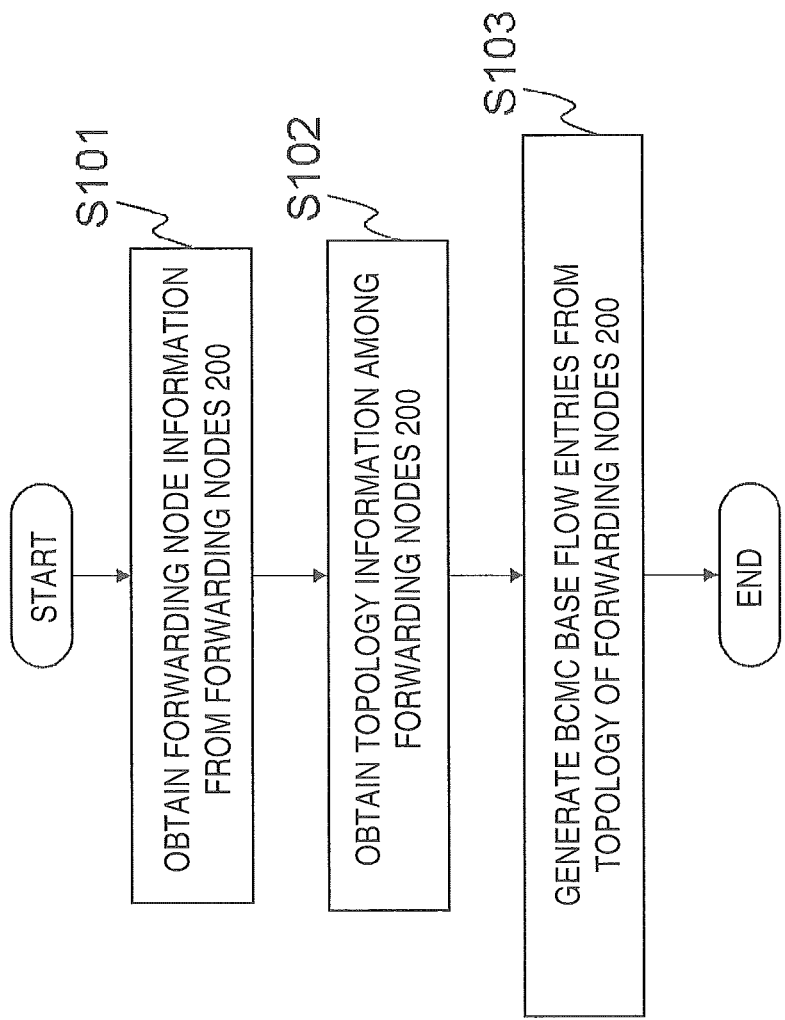
FIG. 9 is a flowchart showing flow of generation processing of a BCMC base flow entry by the control apparatus of the first exemplary embodiment of the present invention.

Next, a detailed description is given concerning operations of the present exemplary embodiment, making reference to the drawings. FIG. 9 is a flowchart representing flow of processing to generate the BCMC base flow entries 400 by the control apparatus 100.

Referring to FIG. 9, first, the forwarding node control unit 102 of the control apparatus 100 obtains information of a forwarding node 200 when connected to the forwarding node 200, and stores the information in the forwarding node information storage unit 104 (step S101).

Next, the forwarding node control unit 102 obtains packets transmitted from the forwarding node 200 to another forwarding node 200 as input packet information from the other forwarding node 200, and by referring to forwarding node information of the forwarding node information storage unit 104, obtains connection information between the forwarding nodes 200 (step S102). The forwarding node control unit 102 reflects the connection information between the forwarding nodes 200 in network topology information of the physical network topology storage unit 105.

Next, the forwarding node control unit 102 obtains a spanning tree such that broadcast or multicast packets are loop-free in the network, based on the network topology information of the physical network topology storage unit 105, and generates a BCMC base flow entry for a broadcast or a multicast, for each forwarding node 200, to be set in the BCMC base flow entry storage unit 106 (step S103).

By the abovementioned processing, a path for a broadcast or a multicast as shown by arrows in FIG. 17 and BCMC base flow entries shown in FIG. 18 to FIG. 20 are generated.

Next, a description is given concerning a procedure as far as when the control apparatus 100 sets a BCMC flow entry implementing a broadcast or a multicast in each BC domain using the abovementioned BCMC base flow entries.

Figure 10:
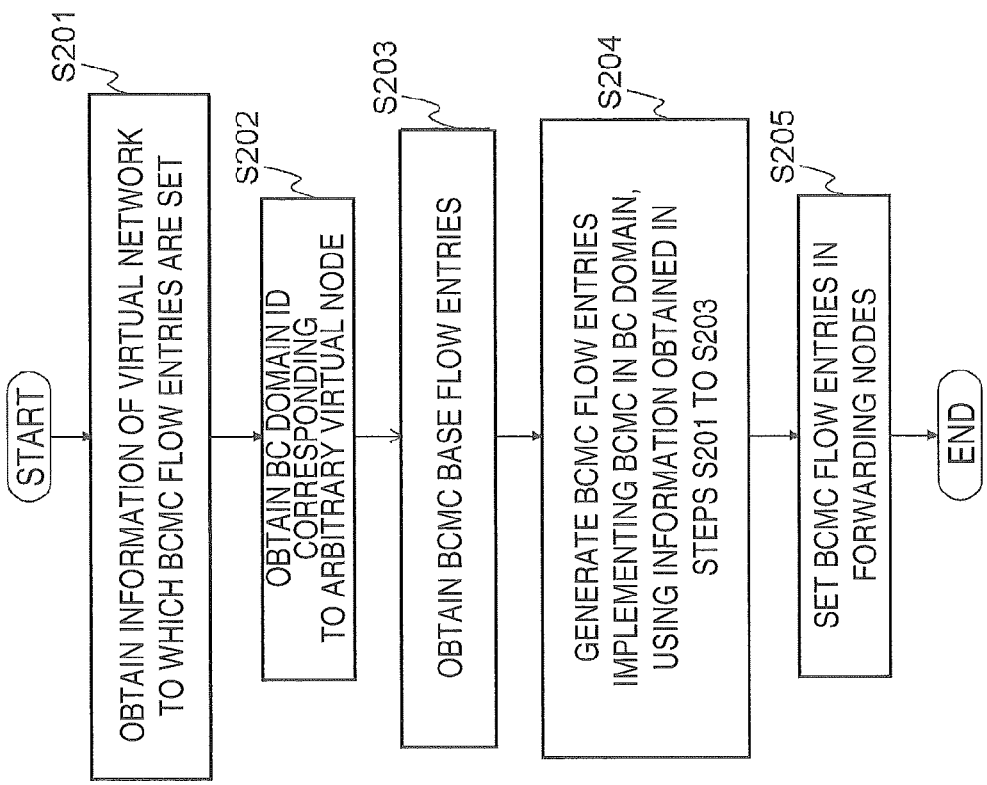
FIG. 10 is a flowchart showing flow of setting processing of a BCMC base flow entry by the control apparatus of the first exemplary embodiment of the present invention.

FIG. 10 is a flowchart representing flow of processing for setting BCMC flow entries 400 by the control apparatus 100. Referring to FIG. 10, first the forwarding node control unit 102 of the control apparatus 100 obtains configuration information of the virtual network, to which BCMC flow entries are set, from the virtual node information storage unit 110 via the virtual network management unit 103 (step S201). Here, the forwarding node control unit 102 obtains virtual node information of the virtual L2SW 502 of the virtual network 500A in FIG. 3, virtual node information of the external NW endpoint 503 that has a connection relationship with the virtual L2SW 502, and virtual network topology information showing connection relationships thereof.

Next, the forwarding node control unit 102 obtains a BC domain ID corresponding to the obtained virtual node, from the virtual node information storage unit 110 via the virtual network management unit 103. In the following description, the BC domain ID of the virtual L2SW 502A=1, and the BC domain ID of the virtual L2SW 502B=2, as shown in FIG. 3. The BC domain ID has a sufficient length in order to uniquely distinguish a broadcast domain of the virtual L2SW 502, and has a range larger than a 12 bit VLAN.

Next, the forwarding node control unit 102 obtains the BCMC base flow entry 400 from the BCMC base flow entry storage unit 106 (step S203). Here, the BCMC base flow entry group shown in FIG. 18 to FIG. 20 is obtained.

Next, the forwarding node control unit 102 uses information obtained in steps S201 to S203 to generate BCMC flow entries realizing the BCMC in the BC domains, and stores these in the flow entry storage unit 107 (step S204). Specifically, a selection is made of the BCMC base flow entries by referring to correspondence relationships of the virtual network and the physical network shown in FIG. 4, and addition or deletion of a BC domain ID with respect to processing content thereof (instruction), addition of the added BC domain ID to a match condition, or branching to another table, are set. As a result, the BCMC flow entry is generated such that there is a 1-to-1 correspondence relationship between VLAN ID and BC domain ID in the respective forwarding nodes 200.

Next, the forwarding node control unit 102 sets the generated BCMC flow entry in the forwarding nodes 200 via the forwarding node communication unit 101.

FIG. 6 to FIG. 8 are examples of flow entries set in order to perform broadcasting by the virtual L2SW 502A (BC domain ID=1) and the virtual L2SW 502B (BC domain=2) of FIG. 3. For example, the BC packet (BC packet of the external node 300A received by the forwarding node 200A) received from the external NW endpoint 503A in FIG. 3 (FIG. 4), as shown in FIG. 6, is processed by a flow entry (flow entry No. 1 in Table #1 in FIG. 6) that holds an instruction to process BC packets received from the external node 300A corresponding to the external NW endpoint 503A, by the second flow table (Table #2), and a flow entry (flow entry No. 1 in Table #2 in FIG. 6) that holds an instruction to insert an MPLS Shim header (BC domain ID=1) and forward to the forwarding node 200B, only in a case where a VLAN ID is 10. In order to process a packet into which the MPLS Shim header (BC domain ID=1) is inserted, as shown in FIG. 7, in the forwarding node 200B, a flow entry (flow entry No. 3 in Table #1 in FIG. 7) is set that has an instruction to delete an MPLS Shim header from a packet in which BC domain ID=1 is set in the MPLS Shim header, by a BC packet received from the forwarding node 200A, and then to rewrite the VLAN ID to 20, and forward to the external node 300B. It is to be noted that according to the flow entry of Table #2 in FIG. 6, even with the BC packet received from the external node 300A, a packet where VLAN is not 10 is dropped (flow entry No. 2 in Table #2 in FIG. 6). From the above, broadcasting is realized in which the BC domain ID=1 for the BC packet transmitted from the external node 300A.

In the same way, for example, the BC packet (BC packet (VLAN ID=20) of the external node 300B received by the forwarding node 200B) received from the external NW endpoint 503B in FIG. 3 (FIG. 4), as shown in FIG. 7, is processed by a flow entry (flow entry No. 1 in Table #1 in FIG. 7) that holds an instruction to output BC packets received from the external node 300B corresponding to the external NW endpoint 503B, from the external node 300C connection port, and to perform processing by the second flow table (Table #2), and a flow entry (flow entry No. 1 in Table #2 in FIG. 7) that holds an instruction to insert an MPLS Shim header (BC domain ID=1) and forward to the forwarding node 200A, only in a case where the VLAN ID is 20. In order to process a packet into which the MPLS Shim header (BC domain ID=1) is inserted, as shown in FIG. 6, in the forwarding node 200A, a flow entry (flow entry No. 2 in Table #1 in FIG. 6) is set that has an instruction to delete the MPLS Shim header from the packet in which BC domain ID=1 is set in the MPLS Shim header, by a BC packet received from the forwarding node 200B, and then to rewrite the VLAN ID to 10 and forward to the external node 300A. It is to be noted that according to a flow entry of Table #2 in FIG. 7, even with the BC packet received from the external node 300B, a packet where the VLAN ID is not 10 is dropped (flow entry No. 2 in Table #2 in FIG. 6). From the above, broadcasting is realized in which the BC domain ID=1 for the BC packet transmitted from the external node 300A.

As described above, in the present exemplary embodiment, in a forwarding node 200 located at an edge, a setting is made of a BCMC flow entry to add a header for a BC domain ID, or, with a BC domain ID as a match condition of a flow entry, as an action thereof, the header for the BC domain ID is deleted and a VLAN ID is applied.

Next, a description is given concerning a procedure for processing a received packet using the abovementioned BCMC base flow entry.

Figure 11:
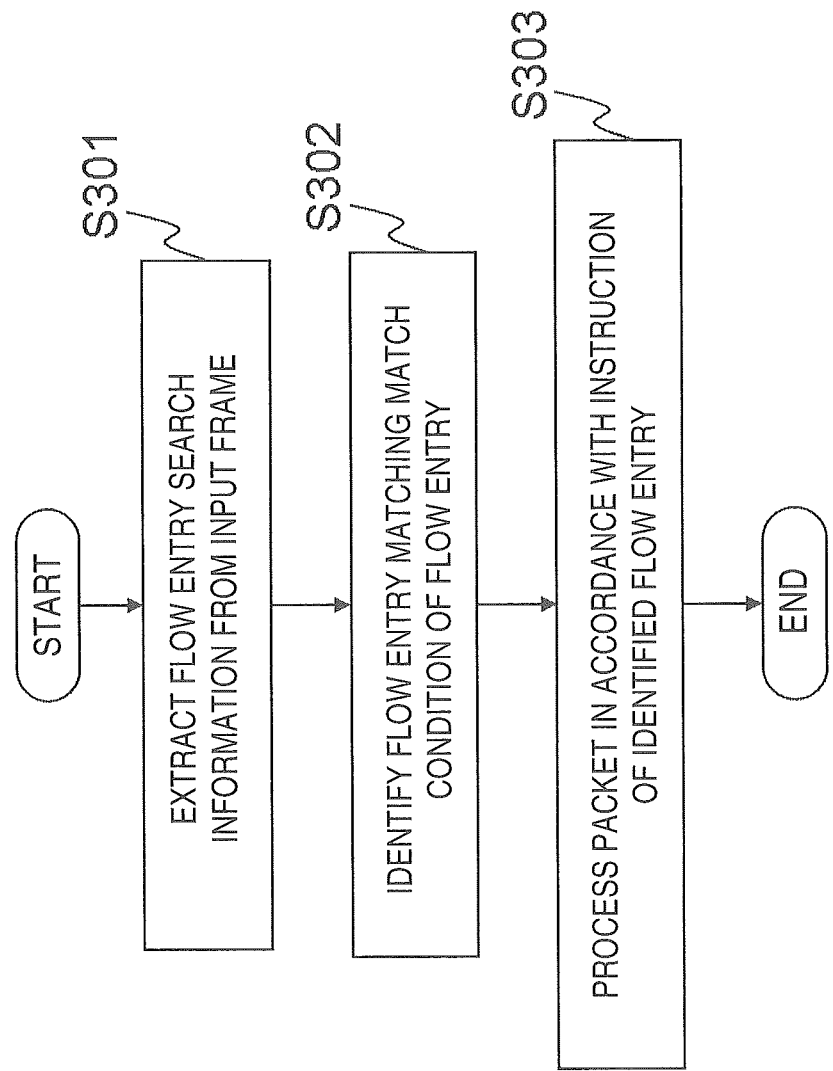
FIG. 11 is a flowchart showing flow of processing when a packet is received from a forwarding node of the first exemplary embodiment of the present invention.

FIG. 11 is a flowchart representing flow of processing of a received packet by a forwarding node 200. Referring to FIG. 11, first, a flow entry search unit 201 of the forwarding node 200 extracts flow entry search condition information in order to search for a flow entry from received packets (step S301). For example, in a case of a match with a match condition of flow entries of FIG. 6 to FIG. 8, an input port, a layer 2 destination address, and a BC domain ID storage range are extracted, as the flow entry search condition information.

Next, the flow entry search unit 201 of the forwarding node 200 identifies a flow entry that conforms with the flow entry search condition information extracted in step S301, from the flow entry storage unit 202. The flow entry search unit 201 passes processing content (instruction or action set)

of the matching flow entry and the received packet to the flow processing unit 204. Here, in a case of receiving a BC packet for which a BCMC address is set in a destination address, the BCMC flow entry that has been set in the forwarding node 200 in step S205 is used.

Next, the flow processing unit 204 of the forwarding node 200 executes forwarding to an external node 300 or another forwarding node, header addition or deletion, and packet dropping or the like, in accordance with a packet passed from the flow entry search unit 201 and processing content (instruction or action set) of a matching flow entry (step S303).

As described above, according to the present exemplary embodiment, even if the number of VLANs is increased to 4,096 or more, it is possible to realize BCMC without an accompanying dramatic increase in the number of flow entries. The reason for this is that flow entries using BC domain IDs, which have a range with 4,096 VLANs or more, as match conditions are generated and set in the forwarding nodes 200. That is, there is no dramatic increase in the number of flow entries, since there is a 1-to-1 correspondence relationship between VLAN IDs and BC domain IDs in the forwarding nodes 200. The number of flow entries does not increase proportionately with the number of external nodes, as in Patent Literatures 1 and 3.

<Second Exemplary Embodiment>

Figure 12:
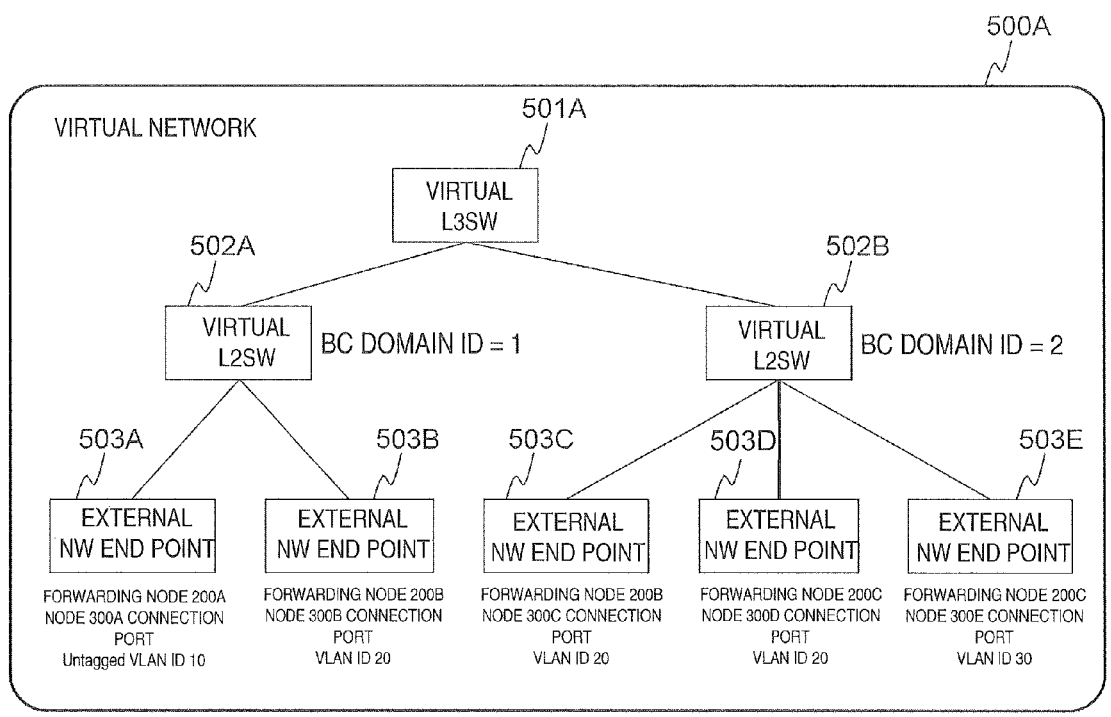
FIG. 12 is a diagram showing a configuration of a virtual network configured by a control apparatus of a second exemplary embodiment of the present invention.

BCMC flow entries exemplified in FIG. 6 to FIG. 8 in the first exemplary embodiment described above assume use of VLANs set in ports of forwarding nodes 200, and correspondence relationships between VLAN IDs and BC domain IDs in the forwarding nodes 200 are limited to 1-to-1 relationships. For example, it is not possible to have a configuration in which an external NW endpoint 503B, corresponding to an external node 300B connection port where the VLAN ID of a forwarding node 200B is 20, has a connection relationship with a virtual L2SW 502A (BC domain ID=1); and similarly, an external NW endpoint 503C, corresponding to an external node 300C connection port where the VLAN ID of the forwarding node 200B is 20, has a connection relationship with a virtual L2SW 502B (BC domain ID=2), as shown in FIG. 12. Furthermore, it is not possible to have a configuration in which an external NW endpoint 503D, corresponding to an external node 300D connection port where the VLAN ID of a forwarding node 200C is 20, has a connection relationship with a virtual L2SW 502B (BC domain ID=2); and similarly, an external NW endpoint 503E, corresponding to an external node 300E connection port where the VLAN ID of the forwarding node 200C is 30, has a connection relationship with a virtual L2SW 502B (BC domain ID=2).

In a second exemplary embodiment of the present invention, in order to have no problem even if a forwarding node control unit 102 of a control apparatus 100 does not use VLAN settings in ports of forwarding nodes 200, a BCMC flow entry is generated for each forwarding node 200 and set in the forwarding node 200. Since fundamental configurations and operations are the same as in the first exemplary embodiment, a description is given below centered on differences with regard to BCMC flow entries.

FIG. 13 to FIG. 15 are diagrams representing BCMC flow entries respectively set in the forwarding nodes 200A to 200C, in the second exemplary embodiment of the present invention. It is to be noted that in order to avoid duplication of the description, VLAN settings of ports of the forwarding nodes 200 are taken as being the same as in the first exemplary embodiment. As shown in FIG. 18 to FIG. 20, the BCMC flow entries differ from the first exemplary embodiment in the point that, in each forwarding node 200, correspondence relationships between port VLAN IDs and BC domains are 1-to-1 relationships.

More specifically, for example, a BC packet (BC packet (VLAN ID=20) of the external node 300B received by the forwarding node 200B) received from the external NW endpoint 503B in FIG. 12, as shown in FIG. 14, is processed by a flow entry (flow entry No. 1 in Table #1 in FIG. 14) that holds an instruction to insert an MPLS Shim header (BC domain ID=1) into a BC packet received from the external node 300B corresponding to the external NW endpoint 503B, and then to forward to the forwarding node 200A, and in addition to perform processing by the second flow table (Table #2), and a flow entry (flow entry No. 1 in Table #2 in FIG. 14) that holds an instruction to drop the BC packet. In order to process a packet into which the MPLS Shim header (BC domain ID=1) is inserted, as shown in FIG. 13, in the forwarding node 200A, a flow entry (flow entry No. 2 in Table #1 in FIG. 13) is set that has an instruction to delete the MPLS Shim header from the packet in which BC domain ID=1 is set in the MPLS Shim header, by a BC packet received from the forwarding node 200B, and then to rewrite the VLAN ID to 10 and forward to the external node 300A.

Similarly, for example, a BC packet (BC packet (VLAN ID=20) of the external node 300C received by the forwarding the node 200B) received from the external NW endpoint 503C in FIG. 12, as shown in FIG. 14, is processed by a flow entry (flow entry No. 2 in Table #1 in FIG. 14) that inserts an MPLS Shim header (BC domain ID=2) into a BC packet (VLAD ID=20) received from the external node 300C corresponding to the external NW endpoint 503C, then forwarded to the forwarding node 200A, and in addition performs processing by the second flow table (Table #2) and a flow entry (flow entry No. 1 in Table #2 in FIG. 14) to drop the BC packet. It is to be noted that since the packet into which the MPLS Shim header (BC domain ID=2) is inserted is a BC packet that does not hit a superior flow entry, in the forwarding node 200C, it is dropped by flow entry No. 5 in Table #1 of FIG. 15.

According to the above description, in the forwarding node 200B, even with the same VLAN ID, different BC domain IDs are associated in accordance with input port. On the other hand, in the forwarding node 200C, even with different VLAN IDs, the same BC domain IDs (BC domain ID=2) are associated based on input port (refer to flow entries No. 1 and No. 2 in Table #1 of FIG. 15).

In the first exemplary embodiment, the number of BCMC flow entries related to an external NW connection port of a forwarding node 200 is the number of external NW connection ports in the forwarding node 200 (for example, the 2 entries, flow entry No. 1 and No. 2, in Table #1 of FIG. 7)+the number of VLAN IDs in all external NW endpoints 503 related to the forwarding node 200 (for example, the 2 entries, flow entry No. 1 and No. 2, in Table #2 of FIG. 7).

In contrast to this, in the second exemplary embodiment, the number of BCMC flow entries related to an external NW connection port of a forwarding node 200 is, at least, the total number of VLAN IDs in all external NW endpoints 503 related to the forwarding node 200 in question (for example, the 2 entries, flow entry No. 1 and No. 2, in Table #2 of FIG. 14). As a result, the more the same VLAN ID is set to plural external NW endpoints 503 related to the forwarding node 200 in question, the more the number of BCMC flow entries increases, with respect to the first exemplary embodiment.

On the other hand, in the second exemplary embodiment, there is an advantage in that there is no limitation to the configuration of broadcast domains and multicast domains in the network. A reason for this is that the forwarding node control unit 102 of the control apparatus 100 generates BCMC flow entries, such that correspondence relationships between port VLAN IDs and BC domains are 1-to-1 relationships, in the forwarding node 200.

A description has been given above of exemplary embodiments of the present invention, but the present invention is not limited to the abovementioned exemplary embodiments, and modifications, substitutions and adjustments may be added within a scope that does not depart from fundamental technical concepts of the invention. For example, in the abovementioned exemplary embodiments a description has been given using the network configuration shown in FIG. 1 and the like, but there is no limitation to the number of forwarding nodes or external nodes.

For example, there is no problem with a configuration (a third exemplary embodiment) where there is a mix of forwarding nodes 200 in which the BCMC flow entries described in the first exemplary embodiment are set, and forwarding nodes 200 in which the BCMC flow entries described in the second exemplary embodiment are set.

It is to be noted that the various disclosures of the abovementioned Patent Literatures and Non-Patent Literatures are incorporated herein by reference thereto. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments and examples, respective elements of the respective drawings, and the like) are possible within the scope of the claims of the present invention. That is, the present invention clearly includes every type of transformation and modification that a person skilled in the art can realize according to the entire disclosure including the scope of the claims and to technological concepts thereof.

100 control apparatus
101 forwarding node communication unit
102 forwarding node control unit
103 virtual network management unit
104 forwarding node information storage unit
105 physical network topology storage unit
106 BCMC base flow entry storage unit
107 flow entry storage unit
108 flow storage unit
109 virtual network topology information storage unit
110 virtual node information storage unit
200, 200A to 200C forwarding node
201 flow entry search unit
202 flow entry storage unit
203 flow entry processing unit
204 flow processing unit
205 control apparatus communication unit
300, 300A to 300E external node
400, 400A to 400C BCMC base flow entry storage unit
500A virtual network
501A virtual L3SW
502A, 502B virtual L2SW
503A to 503E endpoint NW endpoint

What is claimed is:

1. A control apparatus, comprising:
    a memory storing virtual node information concerning a virtual node, the virtual node information including a virtual network identifier; and
    a processor configured to execute program instructions to:
        identify, based on the virtual node information, a network domain identifier corresponding to one of a broadcast domain and multicast domain;
        identify, based on the network domain identifier, a packet processing instruction for processing a packet according to the virtual network identifier and the network domain identifier; and
        send the packet processing instruction to an edge switch apparatus corresponding to the virtual node.

2. The control apparatus according to claim 1, wherein the packet processing instruction includes an instruction for adding the network domain identifier to a header of a received packet based on the virtual network identifier of the received packet.

3. The control apparatus according to claim 1, wherein the packet processing instruction includes an instruction for adding the network domain identifier to a Multi-Protocol Label Switching region of a received packet based on the virtual network identifier of the received packet.

4. The control apparatus according to claim 1, wherein the packet processing instruction includes an instruction for removing the network domain identifier of a received packet.

5. The control apparatus according to claim 1, wherein the processor is further configured to execute program instructions to:
    identify, based on the network domain identifier, a packet forwarding instruction; and
    send the packet forwarding instruction to a core switch apparatus.

6. The control apparatus according to claim 1, wherein the processing instruction includes a first flow entry, a second flow entry, and a packet storing instruction which indicates storing the first flow entry into a first table and storing the second flow entry into a second table respectively.

7. The control apparatus according to claim 1, wherein the virtual network identifier corresponds one to one with the one of the broadcast domain and multicast domain to which the edge switch apparatus belongs.

8. A communication system, comprising:
    an edge switch apparatus; and
    a control apparatus configured to control the edge switch apparatus,
    wherein the control apparatus comprises:
        a memory storing virtual node information concerning a virtual node, the virtual node information including a virtual network identifier; and
        a processor configured to execute program instructions to:
            identify, based on the virtual node information, a network domain identifier corresponding to one of a broadcast domain and multicast domain;
            identify, based on the network domain identifier, a packet processing instruction for processing a packet according to the virtual network identifier and the network domain identifier; and
            send the packet processing instruction to the edge switch apparatus corresponding to the virtual node.

9. The communication system according to claim 8, wherein the packet processing instruction includes an instruction for adding the network domain identifier to a header of a received packet based on the virtual network identifier of the received packet.

10. The communication system according to claim 8, wherein the packet processing instruction includes an instruction for adding the network domain identifier to a Multi-Protocol Label Switching region of a received packet based on the virtual network identifier of the received packet.

11. The communication system according to claim 8, wherein the packet processing instruction includes an instruction for removing the network domain identifier of a received packet.

12. The communication system according to claim 8, further comprising a core switch apparatus,
  wherein the processor is further configured to execute program instructions to:
    identify, based on the network domain identifier, a packet forwarding instruction; and
    send the packet forwarding instruction to the core switch apparatus.

13. The communication system according to claim 8, wherein the processing instruction includes a first flow entry, a second flow entry, and a packet storing instruction which indicates storing the first flow entry into a first table and storing the second flow entry into a second table respectively.

14. The communication system according to claim 8, wherein the virtual network identifier corresponds one to one with the one of the broadcast domain and multicast domain to which the edge switch apparatus belongs.

15. A network control method, comprising:
  identifying, based on virtual node information concerning a virtual node, a network domain identifier corresponding to one of a broadcast domain and multicast domain, the virtual node information including a virtual network identifier;
  identifying, based on the network domain identifier, a packet processing instruction for processing a packet according to the virtual network identifier and the network domain identifier; and
  sending, to an edge switch apparatus corresponding to the virtual node, the packet processing instruction.

16. The network control method according to claim 15, wherein the packet processing instruction includes an instruction for adding the network domain identifier to a header of a received packet based on the virtual network identifier of the received packet.

17. The network control method according to claim 15, wherein the packet processing instruction includes an instruction for adding the network domain identifier to a Multi-Protocol Label Switching region of a received packet based on the virtual network identifier of the received packet.

18. The network control method according to claim 15, wherein the packet processing instruction includes an instruction for removing the network domain identifier of a received packet.

19. The network control method according to claim 15, further comprising:
  identifying, based on the network domain identifier, a packet forwarding instruction; and
  sending the packet forwarding instruction to a core switch apparatus.

20. The network control method according to claim 15, wherein the processing instruction includes a first flow entry, a second flow entry, and a packet storing instruction which indicates storing the first flow entry into a first table and storing the second flow entry into a second table respectively.

21. The network control method according to claim 15, wherein the virtual network identifier corresponds one to one with the one of the broadcast domain and multicast domain to which the edge switch apparatus belongs.

* * * * *